United States Patent [19]

George

[11] 3,924,249

[45] Dec. 2, 1975

[54] COMPLEMENTARY CORNER STRUCTURES FOR MAGNETIC DOMAIN PROPAGATION

[75] Inventor: Peter K. George, Placentia, Calif.

[73] Assignee: Rockwell International Corporation, El Segundo, Calif.

[22] Filed: Mar. 27, 1974

[21] Appl. No.: 455,177

[52] U.S. Cl. .................... 340/174 TF; 340/174 SR

[51] Int. Cl.[2] .................. G11C 11/14; G11C 19/08

[58] Field of Search ........................ 340/174 TF

[56] References Cited

UNITED STATES PATENTS

| | | | |
|---|---|---|---|
| 3,689,901 | 9/1972 | Bobeck | 340/174 TF |
| 3,713,119 | 1/1973 | Bobeck | 340/174 TF |
| 3,789,373 | 1/1974 | Bonyhard | 340/174 TF |

*Primary Examiner*—James W. Moffiti
*Attorney, Agent, or Firm*—H. Fredrick Hamann; G. Donald Weber, Jr.

[57] ABSTRACT

Field access drive, corner structures of soft magnetic material such as permalloy are provided for complementing chevron structures in propagating single wall magnetic domains. The corner structures vary the size of the domains, e.g., change the domains from strip to bubble configurations or vice versa, and form a concentrated array of magnetic poles to facilitate changing the direction of domain propagation using chevron drive structures.

8 Claims, 16 Drawing Figures

COMPLEMENTARY CORNER STRUCTURES FOR MAGNETIC DOMAIN PROPAGATION

CROSS-REFERENCE TO RELATED APPLICATIONS

Reference is made to copending U.S. patent application Ser. No. 455,176, filed Mar. 27, 1974, entitled "Complementary Transition Structures for Magnetic Domain Propagation", to Peter K. George and assigned to the common assignee.

BACKGROUND OF THE INVENTION

1. Field of the Invention

This invention relates to magnetizable overlay structures for controlling the movement of magnetic single wall domains using field access propagation techniques and, more particularly, to field access drive structures.

2. Description of the Prior Art

At present, devices that utilize magnetic single wall domains typically use soft magnetic overlay structures for propagation and storage. Examples include T-bar, T-X, X-bar, and Y-bar structures. The use of propagation channels, such as the Y-bar channel, in magnetic domain devices is made possible by corner structures which transfer domains between propagation channels. See, e.g., U.S. Pat. No. 3,689,901 entitled "Magnetic Domain Detector Arrangement".

Currently, the chevron structure is most frequently used only for detection, although it may also be used for storage and has certain advantages in this regard, as discussed below.

Propagation structures that are of a chevron pattern may incorporate redundancy. That is, the individual chevron-shaped elements are formed into columns transverse to the direction of domain propagation. These chevron columns stretch or expand single wall domains into strip-like form. Because of this redundancy of elements, chevron structures are less sensitive to defects than are structures formed from other patterns (which form single wall domains which more closely approximate a circular cross section and are frequently termed "bubble" domains). Chevrons are also relatively insensitive to gaps between the chevrons. Consequently, the processing yield is higher for chevron structures than for other structures and the difference may be expected to increase with decreasing pattern size.

Chevrons have relatively high drive fields and therefore are more amenable to high frequency operation than other patterns. Also, the strip domains formed by chevrons are less sensitive than are bubble domains to fluctuations in magnetic conditions resulting from defects or other inhomogeneities in the garnet materials that frequently are used in magnetic domain devices.

As a result of the enumerated advantages, chevron structures have excellent potential for use as propagation structures in storage loops, particularly since the development of devices having greater capacity imposes increasingly stringent processing requirements. In addition, the chevron structure will undoubtedly remain as the foundation for strip detection.

In order to fully implement the use of chevron structures both as propagation patterns and in connection with strip detection, it is desirable to provide structures that are capable of smoothly and effectively propagating domains through sharp direction changes (e.g., around corners) between propagation channels formed by structures, for example chevron-shaped.

SUMMARY OF THE INVENTION

In particular, soft magnetic overlay corner structures, chevron overlay structures for propagating single wall domains in sheets of magnetic material in the presence of a cyclically varying magnetic field.

Soft magnetic overlay structures, which include chevron field with concentrated magnetic pole arrangements expand, contract and expand single wall domains within one period of a magnetic drive field to provide abrupt changes in the direction of domain movement controlled by the chevron structures in a minimum time and space.

DESCRIPTION OF A PREFERRED EMBODIMENT

Figure 1:
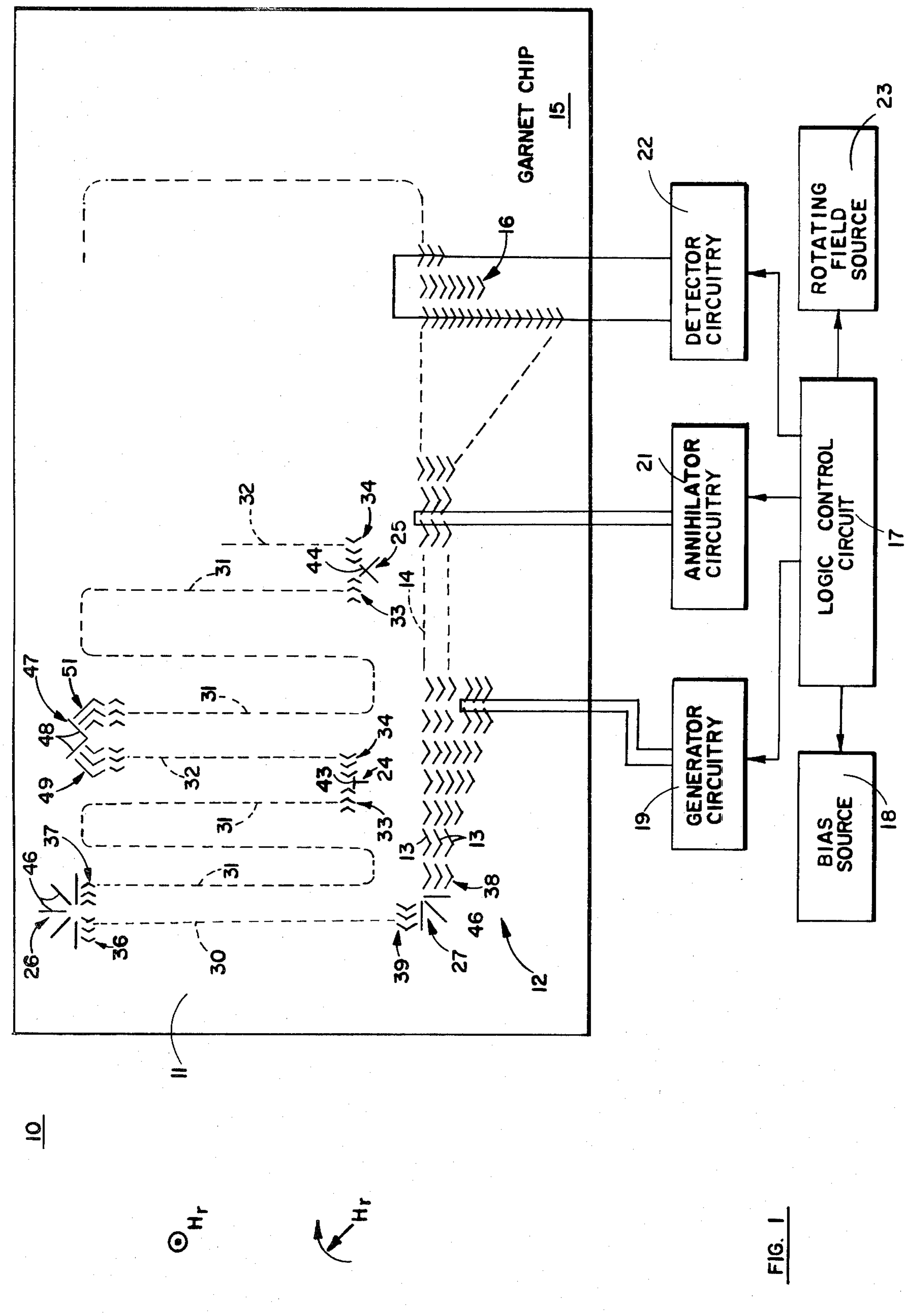
FIG. 1 is a schematic representation of a shift register utilizing single wall magnetic domains and which utilizes the principles of the present invention.

FIG. 1 shows a shift register 10 embodying the principles of the present invention. The present invention relates to corner structures which provide directional changes between chevron propagation structures for single wall domains.

Referring further to FIG. 1, the shift register 10 comprises a sheet or layer 11 of material for forming single wall magnetic domains (not shown) in the presence of a perpendicular bias field $H_b$. Typically, the layer 11 may be in the form of a thin film of magnetic garnet material which is grown on a supporting substrate (not shown), to provide a garnet chip 15. The chip 15 includes a patterned overlay 12 of soft magnetic elements, including chevron elements 13. The chevrons 13 may be used to form channels for effecting movement of the domains. As used here, the word "channels" includes structures such as propagation channel 14 and expansion 16, which facilitates detection of the domains.

The single wall domains may be formed by several methods which are well known in the art. Illustratively, the domains may be generated by pulsing a current in the appropriate direction over one or more chevron elements 13 in the presence of the bias field $H_b$. In a manner well known in the art, a logic control circuit 17 controls the operation of a bias source 18 and generator circuitry 19 for supplying, respectively, the bias field $H_b$ and the current pulses. The logic control circuit 17 also controls domain annihilator circuitry 21 and domain detection circuitry 22. A rotating magnetic field, $H_r$, is effected in the plane of the layer 11 by a rotating field source 23 under the control of logic control circuit 17 to move the domains along the various portions of the overlay 12 of patterned elements.

Referring further to FIG. 1, the overlay 12 includes structures 24–27 (hereafter termed corner patterns 24–27) which are defined by various patterns of elements and which provide arrays of concentrated magnetic poles for facilitating changes in the direction of domain movement. Patterns 24 and 25 transfer domains between chevron channels 31 and 32 along magnetic poles formed by the pattern (in a clockwise rotating field) between end groups of chevrons 33 and 34. The chevrons in each of the opposite channels 31 and 32 connected by corner patterns 24 or 25 have apices which face the chevrons in the opposite channels so that the chevrons "open" away from the chevrons in the opposite channels (32 and 31, respectively). Consequently, the opposite channels 31 and 32 form substantially parallel but oppositely directed paths, hereinafter termed "antiparallel" paths, for domains. Patterns 24 and 25 are hereinafter termed "outside" patterns.

Corner pattern 26 transfers domains between chevron channels 30 and 31, i.e., between chevrons, including end chevron groups 36 and 37, which open toward the chevrons in the opposite connected channels (31 and 30, respectively). Channels 30 and 31 thus provide antiparallel paths for domains.

Corner pattern 27 is similar to pattern 26, but moves domains through a smaller angle (illustratively 90° compared to 180° for pattern 26) between end chevron groups 38 and 39. Both patterns 26 and 27 are hereinafter termed "inside" patterns.

An important feature of the invention is the cooperation between channels and corner structures to vary the size of domains. Strip domains 41 (FIG. 2*a*), the normal configuration of domains during propagation by chevrons are enlarged (see, e.g., FIG. 2*b*) to facilitate transfer from channels to corner structures and vice versa. Also, the corner structures contract the elongated strip domains 41 (FIG. 2*b* ) to bubble domains 42 (FIG. 2*c*), or to a smaller size which approximates the configuration of bubble domains, for propagation around corner structures. Then, the domains are expanded again (FIG. 2*d*) for transfer from the corner structures to other channels. The expansion, contraction, expansion sequence is accomplished within one period of the overlay structure, i.e., within the distance traveled by a domain along the overlay structure in one period of the rotating drive field, $H_r$. As a result, the domain channels can change directions abruptly and the corner patterns can be made very compact, without creating problems, such as domain strip-out, which are frequently encountered in propagating domain strips around corners.

Referring to FIG. 1, outside pattern 24, which forms a 180° corner, comprises a T-shaped element 43 which is positioned adjacent to, and cooperates with, chevron end groups 33 and 34 to provide a concentrated pattern of magnetic poles for transferring domains from propagation channel 31 to channel 32. FIGS. 2*a* –*e* illustrate the sequential movement of a domain along the magnetic poles provided by the corner pattern 24 in a clockwise rotating in-plane field $H_r$. As can be seen, a domain enters the corner as a strip 41, is converted to a slightly elongated bubble 42 by the T element 43, and exits from the corner as a strip.

Before explaining FIGS. 2*a* –*e* in detail, it should be noted that none of the figures is to scale and that the linewidths, gaps, and other dimensions of the patterns are not intended to be precisely accurate. One skilled in the art will easily determine the dimensions that are appropriate for the structures. For example, given the strip width, *w*, of the strip domains 41, the optimum dimensions for linewidth (approximately 0.6w), for the gaps between elements (0.5 × linewidth), and for the periodicity of the structure (approximately 4*w*) may be quickly ascertained.

Figure 2A:
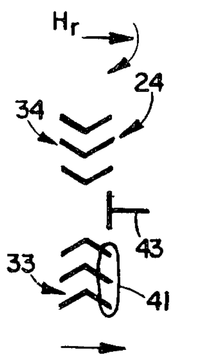
FIGS. 2*a–e* are schematic representations, in chronological order, illustrating the configuration and path of a single wall magnetic domain traversing a corner structure which embodies the principles of the present invention.
Figure 2B:
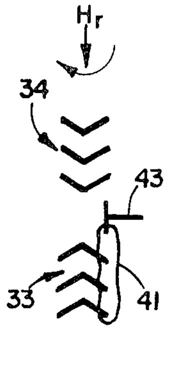
Figure 2C:
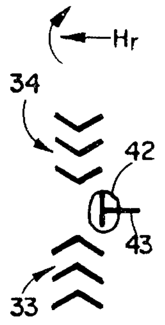
Figure 2D:
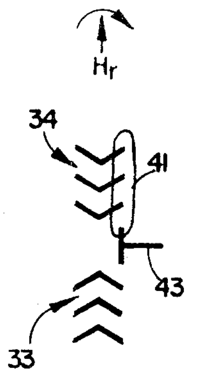
Figure 2E:
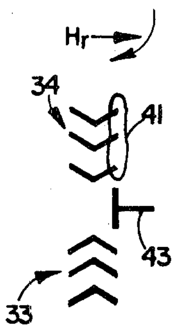
Figure 3A:
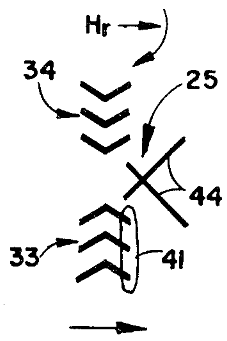
FIGS. 3*a –e* are schematic representations, in chronological order, illustrating the configuration and path of a single wall magnetic domain traversing an alternative corner structure which embodies the principles of the present invention.
Figure 3B:
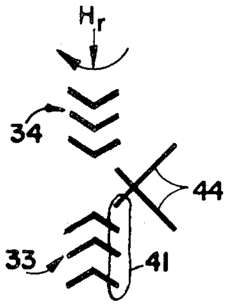
Figure 3C:
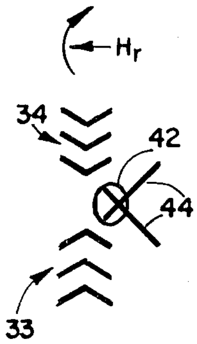
Figure 3D:
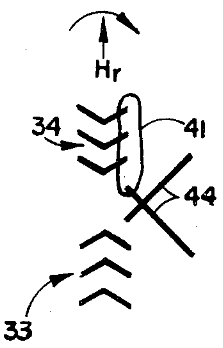
Figure 3E:
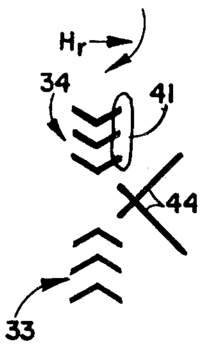
Figure 4A:
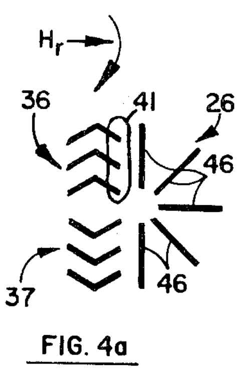
FIGS. 4*a –e* are schematic representations, in chronological order, illustrating the configuration and path of a single wall magnetic domain traversing another alternative corner structure which embodies the principles of the present invention.
Figure 4B:
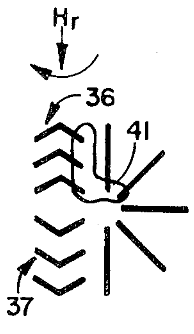
Figure 4C:
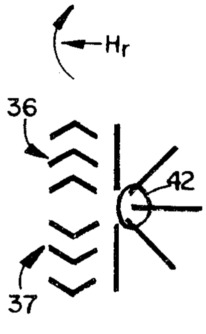
Figure 4D:
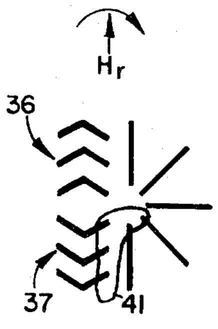
Figure 4E:
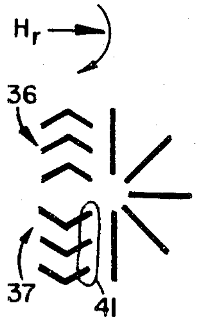

Considering FIGS. 2*a* –*e* again, a strip 41 moving under the influence of the rotating drive field, $H_r$, and in the direction indicated by the arrow in FIG. 2*a*, enters the corner pattern 24 via chevron end group 33; is expanded slightly and moves underneath one end of the T-shaped element 43 (FIG. 2*b* ); and is contracted to form a bubble domain 42 underneath the element 43 (FIG. 2*c*). The bubble domain 42 is then moved to the other chevron end group 34 and is there reconverted to a strip 41 (FIG. 2*d*). It will be noted that the sequence illustrated in FIGS. 2*a–d* is accomplished in less than one period, in about 270° of rotation of $H_r$.

Finally, the reconstituted strip 41 is contracted slightly so that it spans only the chevron elements of the end group 34 (FIG. 2*e*) and is then ready for propagation out of the corner in the direction opposite to that of entry (FIG. 2*a*). It will be noted that the transfer from one channel (e.g., channel 33, FIG. 2*a*) to another (channel 34, FIG. 2*e*) is accomplished within one period.

As shown in FIG. 1, outside corner pattern 25, also a 180° pattern, comprises an X-shaped corner element 44 which cooperates with chevron end groups 33 and 34 in a manner similar to that of the T-shaped corner element 43. The sequential movement of a domain through the corner pattern 25 under the influence of the rotating in-plane field $H_r$ is shown in FIGS. 3*a–e*. The sequence is quite similar to that shown in FIGS. 2*a–e* for corner pattern 24. Accordingly, FIGS. 3*a–e* may be understood by referring to the proceding paragraphs.

Referring again to FIG. 1, inside corner pattern 26 utilizes radial elements 46 which cooperate with chevron end groups 36 and 37 to transfer domains from channel 30 to channel 31. As is typical of chevron patterns, the arms of the individual chevrons 13 are disposed at approximately 110° angles. Consequently, the arms of the individual chevrons of end groups 36 and 37 adjacent to the horizontal, lowermost radial elements are positioned at an angle of about 55° thereto. This angular relationship between the chevron end groups 36 and 37 and the lowermost ones of the radial elements 46 facilitates the transfer of domains from the propagation channels onto the magnetic poles formed by the radial elements, and vice versa.

As shown in FIGS. 4*a–e*, strip domains 41 are moved through the corner pattern 26 in a manner very similar to that shown in FIGS. 2*a–e* and 3*a–e*. For the corner pattern 26, a strip domain 41 is transferred from one chevron channel to another along magnetic poles created at the closely-spaced inner ends of the elements 46. Consequently, the magnetic poles form a dense array that smoothly rotates the domain 42 around the corner as a slightly elongated bubble 42 (FIG. 4*c*) or strip (not shown) depending up the bias conditions.

As an example of the efficacy at high frequencies of corner patterns which embody the principles of the present invention, the operating margin for a chevron propagation structure utilizing exemplary corner patterns 26 was 13.5 oersteds at 100 kHz for a drive field of 40 oersteds. (The chevron propagation structure is not shown, but comprised chevron channels such as channels 30 and 31 (FIG. 1) which were connected by corner patterns 26.) This is an excellent operating margin, as evidenced by the fact that the best existing propagation structures such as the well known T-bar structure (not shown) have operating margins of approximately 10–15 oersteds. Thus, this operating margin indicates the efficacy of chevron propagation structures which utilize corner patterns embodying the present invention. Consequently, the advantages of chevron propagation structures, such as the increased processing yields and the relatively better operating margins at higher frequencies, can be utilized.

Referring again to FIG. 1, radial corner structures may be used for changes in domain propagation direction of other than 180°. Such an application is illustrated by the 90° corner pattern 27. Also, the geometric center of the radial elements 46 can be shifted relative to the chevrons 13 and/or the radial elements can be positioned at angles that are either larger or smaller than the 45° increments shown for corner patterns 26 and 27. For example, FIG. 1 shows a corner pattern 47 having elements 48 which are arranged at 90° intervals. To aid in rotating domains into and out of the corner, the elements 48 of corner pattern 47 are positioned perpendicular to extended arms of the chevrons of end groups 49 and 51.

Thus, there have been described corner structures utilizing high magnetic pole densities to facilitate rapid changes in the direction of propagation of single wall domains in devices that use chevron structures. The scope of the invention is limited, however, only by the claims appended hereto and equivalents thereof.

Having thus described a preferred embodiment of the invention, what is claimed is:

1. A magnetic domain device comprising:

a layer of magnetic material in which single wall magnetic domains can be moved;

a patterned arrangement comprising a plurality of magnetically soft elements in juxtaposition to and supported by said layer, said magnetically soft elements responsive to a cyclically varying magnetic field in the plane of said layer for moving domains in said layer along a channel defined by said patterned arrangement, at least one portion of said channel comprising an array of cooperating elements operative within one period of said cyclically varying magnetic field to enlarge, contract, and enlarge a domain propagated thereby in order to change the continuing direction of said domain.

2. A magnetic domain device comprising:

a layer of magnetic material in which single wall domains can be be moved;

a patterned arrangement of magnetically soft elements in juxtaposition to said layer and operative in the presence of a cyclically varying magnetic field in the plane of said layer to form at least two channels for moving domains in said layer along paths defined by said channels, each of said channels having end portions formed by said patterned arrangement and comprising at least one column of adjacent chevron-shaped elements; and at least one transfer structure of magnetically soft elements for transferring domains between said channels, said transfer structure disposed adjacent to respective end portions of two of said channels; said transfer structure establishing a plurality of magnetic poles in response to said varying magnetic field to elongate domains on said end portion of a first one of said two channels for transfer to said transfer structure, then contract the domains for movement across said transfer structure, and then elongate the domains for transfer to said end portion of the second of two of said channels.

3. The device as defined in claim 2 wherein said end portions include chevron-shaped elements of different lengths such that said transfer structure defines a smaller angle.

4. A device as defined in claim 2, wherein said transfer structure comprises a plurality of elements radially disposed about a common center, said transfer structure disposed between adjacent end portions of two of said channels.

5. The device as defined in claim 4 wherein said transfer structure comprises at least one element disposed adjacent each of said end portions and extending normal to the direction of movement in the respective adjacent end portion, and at least one additional element disposed between the elements adjacent said end portions and arranged at an angle therewith.

6. A device as defined in claim 2 wherein said transfer structure comprises at least two elements which intersect.

7. A device as defined in claim 6, wherein said transfer structure comprises a pair of elements, one element bisecting the other to form a T-shaped configuration, the bisected element disposed between adjacent end portions of two of said channels.

8. A device as defined in claim 6, wherein said transfer structure comprises a pair of intersecting elements which form a substantially X-shaped configuration.

* * * * *

UNITED STATES PATENT AND TRADEMARK OFFICE

CERTIFICATE OF CORRECTION

PATENT NO. : 3,924,249

DATED : December 2, 1975

INVENTOR(S) : Peter K. George

It is certified that error appears in the above-identified patent and that said Letters Patent are hereby corrected as shown below:

In Column 2, delete all the material contained in lines 5-15 after the heading "SUMMARY OF THE INVENTION" and before the heading "BRIEF DESCRIPTION OF THE DRAWINGS", and insert therefor --The present invention facilitates the use of soft magnetic, overlay structures, for example chevron-shaped, for propagating single wall domains in sheets of magnetic material in the presence of a cyclically varying magnetic field.

In particular, soft magnetic overlay corner structures with concentrated magnetic pole arrangements expand, contract and expand single wall domains within one period of a magnetic drive field to provide abrupt changes in the direction of domain movement controlled by the chevron structures in a minimum time and space.--

Signed and Sealed this

*fourth* Day of *May 1976*

[SEAL]

*Attest:*

RUTH C. MASON
*Attesting Officer*

C. MARSHALL DANN
*Commissioner of Patents and Trademarks*